United States Patent [19]

Hunt

[11] Patent Number: 4,930,924
[45] Date of Patent: Jun. 5, 1990

[54] LOW WEAR ARTICULATED BUOY

[75] Inventor: Edwin S. Hunt, Arlington, Va.

[73] Assignee: DEI Enterprises, McLean, Va.

[21] Appl. No.: 305,822

[22] Filed: Feb. 3, 1989

[51] Int. Cl.$^5$ ............................................. F16B 1/00
[52] U.S. Cl. ....................................... 403/24; 403/74; 403/225
[58] Field of Search ............... 403/58, 74, 225, 221, 403/222, 228, 24

[56] References Cited

U.S. PATENT DOCUMENTS

| | | | |
|---|---|---|---|
| 2,019,052 | 10/1935 | Lord | 403/221 X |
| 2,049,024 | 7/1936 | Robertson | 403/228 |

FOREIGN PATENT DOCUMENTS 702229  1/1931  France ................. 403/225

Primary Examiner—Andrew V. Kundrat
Attorney, Agent, or Firm—Cushman, Darby & Cushman

[57] ABSTRACT

A low-wear articulated buoy joint with first and second bushings. Each bushing has an inner shaft member, an elastomeric material bonded to an outside surface of the inner shaft member, and an outer, hollow cylindrical member into which the elastomeric material and inner shaft are press-fit. When the inner shaft of either bushing is rotated with respect to the outer member, the elastomeric material exerts a restorative torque on the shaft. The outer member of the first bushing is fixedly attached to the outer member of the second bushing. The first and second bushings are disposed at an angle of 90° with respect to one another. The shaft member of the first bushing is fixed to a sinker, and the shaft of the second bushing is fixed to a buoy column.

15 Claims, 2 Drawing Sheets

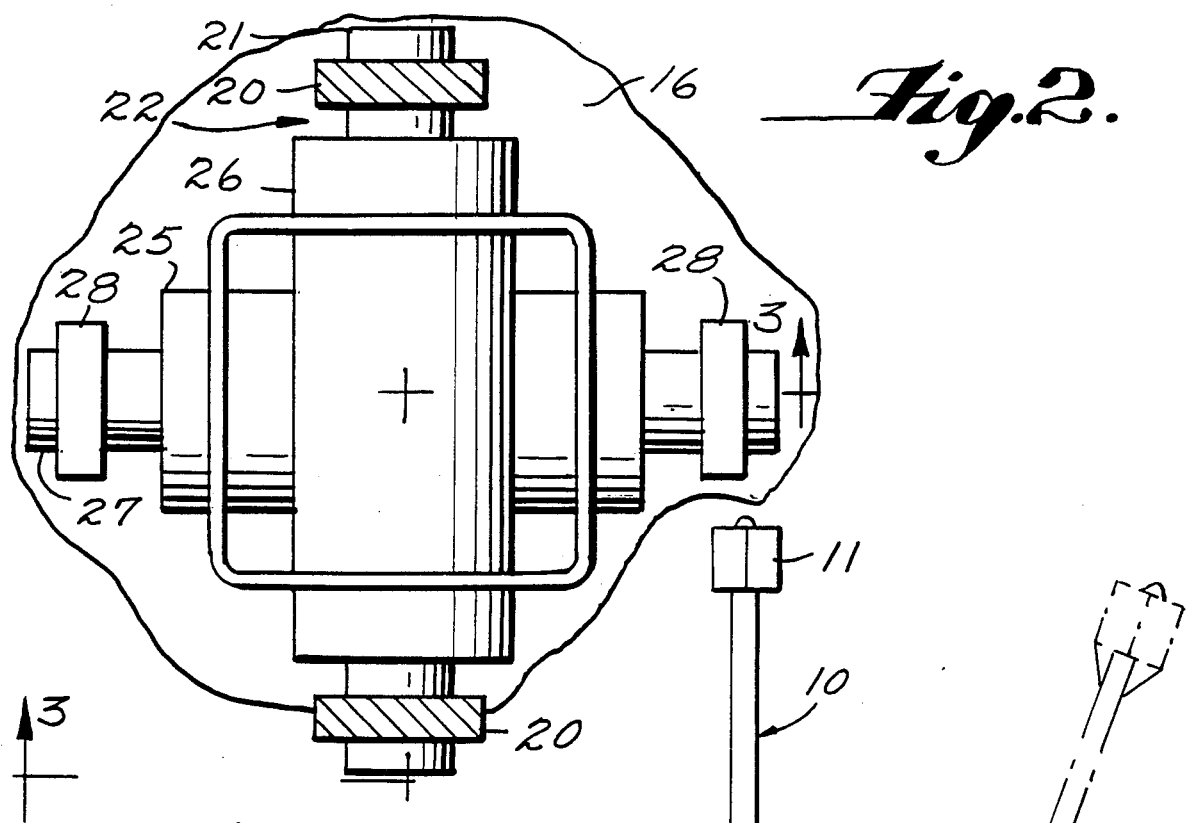

LOW WEAR ARTICULATED BUOY

BACKGROUND OF THE INVENTION

The present invention relates to a low wear articulated buoy universal joint and buoy incorporating the joint. More particularly, the present invention relates to a universal buoy joint which is relatively inexpensive, can be easily incorporated into existing buoy designs, will have essentially zero-wear and will reduce the rotation about the buoy axis such that the markers will deviate less from the desired orientation. Furthermore, the present invention relates to a joint which is reliable during long term operation.

Articulated buoys have been developed to more accurately mark ship navigation channels and thereby reduce the channel width which must be dredged. Such buoys comprise a concrete sinker or anchor, a universal joint and a column. The column includes a buoyancy float at the top and a counterweight at the bottom. Without the counterweight, the large static uplift force produced by the buoyancy float would be transferred to the universal joint. The articulated buoy universal joint must accommodate a concrete sinker or anchor of significant weight hanging on the joint during installation. The joint must also accommodate joint loads and motions which occur during long periods of service. Furthermore, the joint must be fabricated of materials which will survive for long periods in a typical harbor or channel environment.

Universal joints on articulated buoys are known in which the joint is of the shackle type. Such a buoy is shown in the U.S. Pat. No. 3,800,347. According to this patent, the universal joint is created by linking two U-shape members together. One of the U-shape members is connected to the sinker and the other to the column of the buoy. While this type of joint is inexpensive to fabricate, it wears quickly. Wear on the joint is due to high contract (Hertz) stresses, constant working of the joint produced by buoy pitch motion, and abrasion by particles in the water near the channel floor. Wear also results from reversals in vertical load direction and rotations about the column axis. Field experience has shown that this type of joint lasts between 1 and 3 years. Such a short life span is undesirable in articulated buoys because replacement of the joint involves removal of the entire buoy. This is both time consuming and expensive.

Other types of joint designs have also been proposed for use in articulated buoys. Such designs include a simple section of flexible hose, universal ball and seat type bearings and mechanical joints. A mechanical ball and seat-type joint is also shown in U.S. Pat. No. 3,800,347. None of the above alternative joints is entirely satisfactory.

Mechanical joints involve close tolerance parts, making them relatively expensive. Mechanical joints require expensive materials, complex fabrication processes, and redundancy of systems to keep salt water and abrasive contaminants from between wearing surfaces. Mechanical joints also require extensive testing programs to confirm long term performance.

One type of mechanical joint commonly proposed for use in articulated buoys is a so-called Hooke's type joint with mechanical bearings. U.S. Pat. No. 4,037,273 shows such a Hooke's type joint. Such a joint tends to be expensive and still sensitive to wear unless carefully sealed. Another mechanical joint of the type proposed for use in articulated buoys is described in U.S. Pat. No. 3,666,395. This design is also expensive and sensitive to wear.

Hose-type joints comprise a short segment of hose installed between the column and the sinker in such a manner that the column pitch would be accommodated by bending of the hose. These joints are not subject to the same type of wear as mechanical joints, but are subject to buckling in the event that downward loads are produced due to wave action or absorption of water by the buoyancy float. Operating experience on offshore loading terminals has shown that hose life can be as short as 1-2 years in high cyclic loading environments.

Ball and seat type universal joints also involve close tolerance of parts, expensive materials, complex fabrication processes, and require expensive seal systems to keep salt water and abrasive contaminants from between the wearing surfaces. A ball and seat type joint for articulated buoys is described in U.S. Pat. No. 3,800,347.

Pat. No. 4,451,170, FIGS. 6 and 7, shows a ball and seat type universal joints with an elastomeric material between the ball and seat to accommodate joint rotation without wear. However, the joint shown is expensive to fabricate and will not permit 90° rotations which could occur during buoy installation or if a buoy were to be run over by a barge etc. during operation.

It is therefore an object of the present invention to provide a low-wear articulated buoy joint which is relatively inexpensive. It is also an object of the present invention to provide a joint which can be easily incorporated into existing buoy designs. It is a further object of the present invention to provide a joint which will have essentially zero-wear. A still further object of the present invention is to provide a joint which will reduce the rotation about the buoy axis so that the markers will deviate less from the desired orientation.

SUMMARY OF THE INVENTION

In accordance with the above objects, the present invention provides a low-wear articulated buoy joint comprising first and second bushings. Each bushing has an inner shaft member, an elastomeric material bonded to an outside surface of the inner shaft member, and an outer, hollow cylindrical member into which the elastomeric material and inner shaft are press-fit. When the inner shaft of either bushing is rotated with respect to the outer member, the elastomeric material exerts a restorative torque on the shaft. Means are provided for fixedly attaching the outer member of the first bushing to the outer member of the second bushing. The first and second bushings are disposed at an angle of 90° with respect to one another. Means are also provided for fixedly attaching the shaft member of the first bushing to a sinker, and means are provided for fixedly attaching the shaft of the second bushing to a buoy column.

In a preferred embodiment of the present invention, first and second half-cylindrical sections are disposed between the outer member and the elastomeric material in each of the bushings. The half-cylindrical sections are bonded to the elastomeric material and define first and second axial spaces between the sections. First and second key members fix the rotation of the outer member with respect to the cylindrical sections. The key members are disposed in the axial spaces between the cylindrical sections and in corresponding grooves in the outer member.

In a further preferred embodiment, the means for fixedly attaching the outer member of the first bushing to the outer member of the second bushing comprises a one-piece box tube.

Further objects, features, and advantages of the present invention will become apparent from the brief description of preferred embodiments which follows, when considered in conjunction with the figures of drawings. In the figures, like parts are referred to with like reference numerals.

BRIEF DESCRIPTION OF THE DRAWINGS

In the drawings:

FIG. 1 shows an articulated buoy of the prior art;

FIG. 2 shows a top plan view and partial cross-section of the articulated buoy joint of the present invention;

FIG. 5 shows a cross-section of an unassembled portion of a preferred embodiment of the bushings in the joint of the present invention; and FIG. 6 is a cross-section of the completed bushing according to the embodiment of FIG. 5.

DESCRIPTION OF THE PREFERRED EMBODIMENTS

Figure 3:
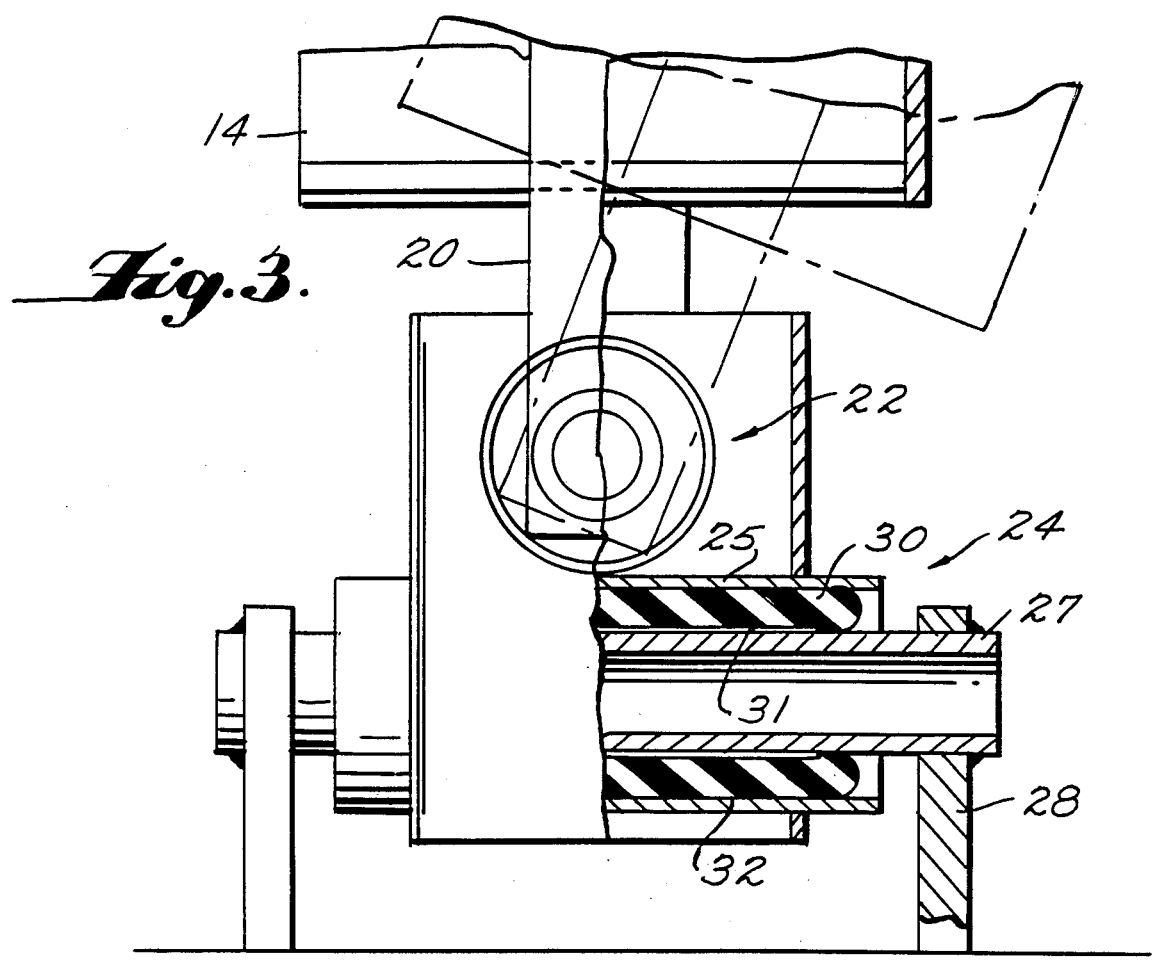
FIG. 3 shows a cut-a-away view of one bushing of the joint of the present invention showing rotation of the upper bushing of the present invention.

The universal joint of the present invention comprises two crossed, elastomeric torsion bushings. Column pitch will be accommodated by shear of the elastomeric bushings. By crossing two bushings at 90°, column pitch motions can be accommodated in any direction. Vertical stacking permits bushings with a large length to diameter ratio to be incorporated in a compact joint arrangement. A high length to diameter ratio is desirable to keep radial stresses in the elastomer low, provide resistance to lateral loads, and to minimize rotation about the column vertical axis.

The universal joint according to the present invention is attached to the column and sinker of the articulated buoy by bars which are welded to the inner shafts of the elastomeric torsion bushings. The bars may be welded to the sinker and to the bottom of the column prior to installation. The elastomeric bushings will hold the short connection piece in a vertical orientation as the gravity base or sinker is lowered over the side of the installation vessel. Once over the side, the column of the buoy can be assembled using methods currently in use by those of the skill in the art. This approach will eliminate the need to rotate the elastomeric bushings 90° during installation. However, the bushings will accommodate 90° of rotation if required.

The joint assembly comprises a housing and two crossed-elastomeric torsion bushings with central tubular shafts.

The elastomeric bushings of the present invention should be designed to meet the following requirements:

(1) They should accommodate the weight of the sinker or gravity base hanging on the joint during installation.

(2) They should accommodate rotation of up to 90° during operation and installation if necessary.

(3) They should accommodate joint rotations which occur during up to long periods of service. Rotation angles can exceed 60° under certain conditions.

(4) They should be constructed of materials which will survive for long periods in typical harbor and channel conditions.

Reference will now be made to the drawings in which like parts are referred to by like reference numerals.

FIG. 1 shows a conventional articulated buoy 10. The buoy 10 comprises a marker 11, a buoyancy float 12, a column 13, a counterweight 14, a universal joint 15 and a sinker 16. The purpose of counterweight 14 is to limit the static load applied to joint 15. Without counterweight 14, a large static uplift force produced by the buoyancy float would be imposed on the joint 15. The buoyancy float 12 is attached to column 13 at a point below the surface 17 of the water.

FIG. 2 shows a top plan view and partial cross-section of the articulated buoy joint of the present invention. A section is taken through bars 20 which connect inner shaft 21 of bushing 22 with column 13 (not shown). It can be seen from FIG. 11 that bushing 22 is above bushing 24 in the plane of the figure. Outer cylindrical members 25, 26 of bushings 24, 22, respectively, are fixed, preferably welded to box tube 23. Inner shafts 21, 27 are disposed at a 90 rotation from one another so as to allow buoy 10 to tilt in any direction from the vertical position. Inner shaft 27 of bushing 24 is fixed, preferably welded to bars 28. Bars 28 anchor the shaft 27 to sinker 16. Shaft 21 of bushing 22 therefore does not rotate with respect to column 13, and shaft 27 of bushing 24 does not rotate with respect to sinker 16.

FIG. 3 shows a cut-a-way view of bushing 24 of the joint of the present invention and shows the rotation of the bushing 22 of the present invention. FIG. 3 does not show whether bars 20 are fixed to the counterweight 14 or column 13. Bars 20 can be fixed to either column 13 or counterweight 14. Elastomeric material 30 is shown to be disposed between the outer surface of inner shaft 27 and the inner surface of outer cylindrical member 25. Elastomeric material 30 is in fact bonded to inner shaft 27 at region 31. The elastomeric material is press fit into outer member, 25 and held thereto by frictional forces.

Significant pressures are needed between the elastomeric material 30 and the outer material so that member 25 may be rotated at least 15° with respect to inner shaft 27 before slippage occurs between the inner surface of member 25 and material 30. Slippage may result in some wear of the bushing, but rotations of more than 15° occur infrequently in articulated buoys. In the absence of slippage, rotation is accommodated by shear of the elastomeric material 30. Each rotation therefore causes a restorative torque to be exerted on outer member 25 when it rotates with respect to inner shaft 27.

Figure 4:
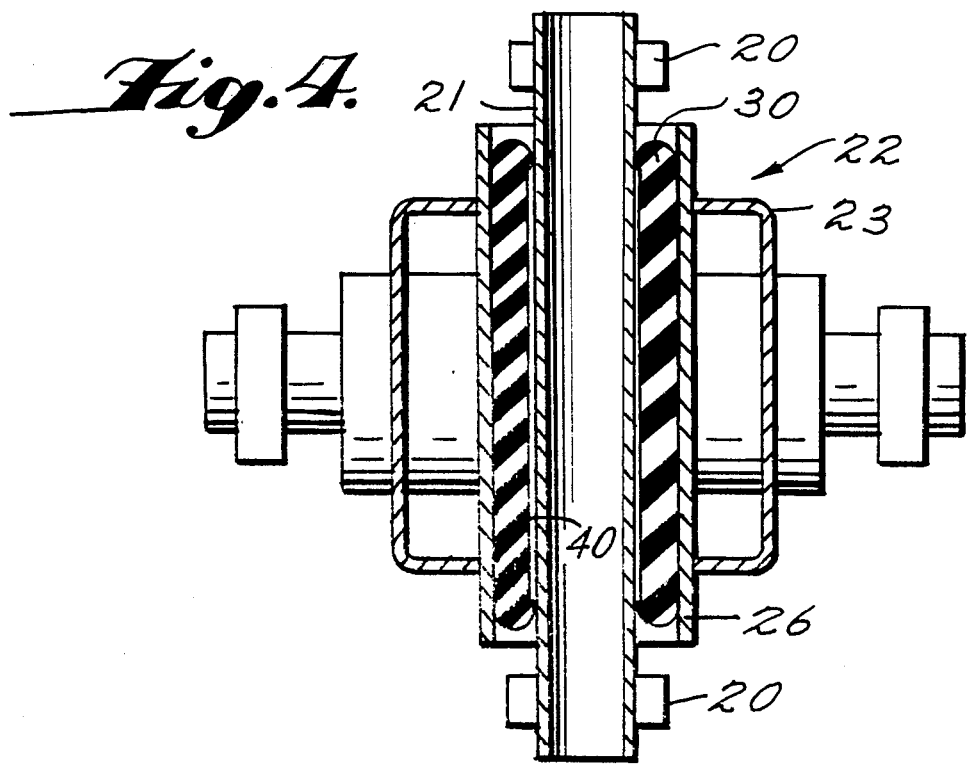
FIG. 4 shows a cross-sectional view of one bushing according to the present invention.

FIG. 4 shows a cross-sectional view of bushing 22 according to the present invention. As can be seen from the figure, the construction of bushings 22,24 is essentially identical. Elastomeric material 30 is bonded to the outer surface of inner shaft 21 at region 40, and elastomeric material 30 is press fit into the outer member 26.

FIG. 5 shows a cross-section of an unassembled portion of a preferred embodiment of the bushings in the joint of the present invention. In this embodiment, elastomeric material 30 is bonded to inner shaft 50 at region 54. Two half-cylindrical sections 51, 52 are bonded to elastomeric material at region 53. Sections 51, 52 define axial spaces 55, 56.

FIG. 6 is a cross-section of the completed bushing 60 according to the embodiment of FIG. 5. Elongated keys 63 fit in grooves 61 on the inside of outer member 62. The keys 63 fit into the axial spaces 55, 56 and prevent outer member 62 from rotating with respect to cylindrical sections 51, 52. The keys 63 engage the sections 51, 52 when the elastomeric material 30 and sections 51, 52 are press fit into outer member 62.

Since cylindrical sections 51, 52 are bonded to elastomeric material 30, outer member 62 can rotate at least 90° with respect to inner shaft 50 without slippage occurring between the elastomer 30 and the outer member 62. This embodiment of the bushing is therefore an essentially zero-wear bushing. Relative rotation between outer member 62 and inner shaft 50 are accommodated only by shear in the elastomeric material 30.

Yet another embodiment of the bushings of the present invention is possible in which the elastomeric material is bonded to both the inner shaft member and the outer member. After the elastomeric material is molded between the two members, the outer member is compressed around the elastomeric material and the inner shaft.

Natural rubber is preferably selected for the elastomeric material of the bushings according to the present invention because it has the best fatigue resistance and is least susceptible to manufacturing problems Since water penetration is very small relative to the length of the bushing, water absorption is not a significant problem. The torsion bushing must have adequate strength to resist the radial loads and good elongation properties to permit rotation without developing excessive shear stresses. A 60 Durometer A hardness represents a good balance between these properties, and is preferable.

The shafts, cylindrical sections, keys outer members and housing of the joint of the present invention are preferably of carbon steel. Carbon steel should have no serious problems with corrosion even after several years of operation. General corrosion rates just above the mud line should be less than about 6 mills/year for uncoated, exposed steel surfaces. While such a loss would be acceptable the exposed joint parts are preferably sandblasted and painted with a heavy-duty epoxy material.

Although preferred embodiments of the present invention have been described, one of ordinary skill in the art will recognize that many modifications and variations of the present invention are possible in light of the above teachings. It is therefore understood that the invention may be practiced otherwise than specifically described within the scope of the present invention.

What is claimed is:

1. A low wear articulated buoy comprising, a buoy column, a sinker and a joint comprising:
   a. a first bushing having an inner shaft member, an outer hollow cylindrical member surrounding the inner shaft, an elastomeric material disposed between the inner shaft and the outer member, wherein, when the inner shaft is rotated with respect to the outer member, the elastomeric material can accommodate the relative motion in shear;
   b. a second bushing having an inner shaft member, an outer hollow cylindrical member surrounding the inner shaft, an elastomeric material disposed between the inner shaft and the outer member wherein, when the inner shaft is rotated with respect to the outer member, the elastomeric material can accommodate the relative motion in shear;
   c. means for fixedly attaching the outer member of the first bushing to the outer member of the second bushing, wherein the first bushing is disposed at an angle of 90° with respect to the second bushing;
   d. means for fixedly attaching the shaft member of the first bushing to said sinker; and
   e. means for fixedly attaching the shaft of the second bushing to said buoy column.

2. A buoy as recited in claim 1, wherein, in each of said first and second bushings, said elastomeric material is bonded to an outside surface of said inner shaft member, and said inner shaft and the elastomeric material bonded to the inner shaft are press-fit into said outer hollow cylindrical member.

3. A buoy as recited in claim 1,
   wherein, in each of said first and second bushings, said elastomeric material is bonded to an outside surface of said inner shaft member and bonded to an inner surface of said outer hollow cylindrical member, and
   wherein said outer member is compressed to fit around said elastomeric material and said inner shaft.

4. A buoy according to claim 1, wherein friction between the elastomeric material and said outer member prevents slippage between the elastomeric material and the outer member.

5. A buoy according to claim 1, wherein the means for fixedly attaching the outer member of the first bushing to the outer member of the second bushing comprises a housing.

6. A buoy according to claim 2, wherein the means for fixedly attaching the outer member of the first bushing to the outer member of the second bushing comprises a housing.

7. A buoy according to claim 1, wherein the elastomeric material is natural rubber.

8. A buoy according to claim 2, wherein the elastomeric material is natural rubber.

9. A buoy according to claim 2, wherein the outer member may be rotated at least 90° with respect to the inner shaft without slippage of the elastomeric material occurring.

10. A buoy according to claim 1, wherein said elastomeric material provides a restorative torque when said inner shaft is rotated with respect to said outer member.

11. A buoy according to claim 2, wherein said elastomeric material provides a restorative torque when said inner shaft is rotated with respect to said outer member.

12. A lower wear articulated buoy comprising, a buoy column, a sinker and a joint comprising:
   a. a first bushing having an inner shaft member, an outer hollow cylindrical member surrounding the inner shaft, an elastomeric material disposed between the inner shaft and the outer member, wherein, when the inner shaft is rotated with respect to the outer member, the elastomeric material can accommodate the relative motion in shear;
   b. a second bushing having an inner shaft member, an outer hollow cylindrical member surrounding the inner shaft, an elastomeric material disposed between the inner shaft and the outer member, wherein, when the inner shaft is rotated with respect to the outer member, the elastomeric material can accommodate the relative motion in shear;
   c. means for fixedly attaching the outer member of the first bushing to the outer member of the second bushing, wherein the first bushing is disposed at an angle of 90° with respect to the second bushing;
d. means for fixedly attaching the shaft member of the first bushing to said sinker;
e. means for fixedly attaching the shaft of the second bushing to said buoy column, wherein each of said first and second bushings further comprises;
f. first and second half-cylindrical sections disposed between the said outer member and said elastomeric material and bonded to said elastomeric material, wherein the half-cylindrical sections define first and second axial spaces between the sections; and
g. first and second key members to fix the rotation of the outer member with respect to the half-cylindrical sections, wherein the key members are disposed in the axial spaces between the cylindrical sections and in corresponding grooves in the outer member.

13. A buoy according to claim 12, wherein said keys prevent slippage between said outer members an said elastomeric material.

14. A buoy according to claim 12, wherein the housing is a single piece box tube.

15. A buoy according to claim 13, wherein the housing is a single piece box tube.

* * * * *